(12) United States Patent
Zang et al.

(10) Patent No.: US 9,287,982 B2
(45) Date of Patent: Mar. 15, 2016

(54) DPOE SYSTEM AND SERVICE AUTO-CONFIGURATION METHOD AND NETWORK BASED THEREON

(75) Inventors: Meiyan Zang, Shenzhen (CN); Liquan Yuan, Shenzhen (CN); Chaoqin Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 168 days.

(21) Appl. No.: 14/009,703

(22) PCT Filed: Mar. 20, 2012

(86) PCT No.: PCT/CN2012/072633
§ 371 (c)(1),
(2), (4) Date: Oct. 3, 2013

(87) PCT Pub. No.: WO2012/139453
PCT Pub. Date: Oct. 18, 2012

(65) Prior Publication Data
US 2014/0023366 A1 Jan. 23, 2014

(30) Foreign Application Priority Data

Apr. 13, 2011 (CN) .......................... 2011 1 00921130

(51) Int. Cl.
*H04J 14/00* (2006.01)
*H04B 10/27* (2013.01)
(Continued)

(52) U.S. Cl.
CPC ............ *H04B 10/27* (2013.01); *H04L 12/4641* (2013.01); *H04L 41/04* (2013.01);
(Continued)

(58) Field of Classification Search
CPC .... H04B 10/27; H04B 10/271; H04B 10/272; H04B 10/275; H04B 10/2755; H04B 10/278; H04L 12/24; H04L 12/4641; H04L 41/04; H04L 41/0806; H04L 41/0226; H04L 61/2015; H04Q 11/00; H04Q 11/0067; H04J 14/023; H04J 14/0232; H04J 14/0238; H04J 14/0239; H04J 14/0242; H04J 14/0243; H04J 14/0245; H04J 14/0246; H04J 14/0247; H04J 14/025; H04J 14/0252; H04J 14/0249
USPC .................................... 398/71, 70, 72, 66, 58
See application file for complete search history.

(56) References Cited

U.S. PATENT DOCUMENTS 8,023,820 B2 * 9/2011 Bernard ................ H04J 3/1694
398/66

(Continued)

FOREIGN PATENT DOCUMENTS

| CN | 101741712 | 6/2010 |
| CN | 101888575 A | 11/2010 |

(Continued)

OTHER PUBLICATIONS

International Search Report mailed Jun. 28, 2012 in International Application No. PCT/CN2012/072633.
(Continued)

*Primary Examiner* — M. R. Sedighian
(74) *Attorney, Agent, or Firm* — Plumsea Law Group, LLC

(57) ABSTRACT

A DPOE system and a service auto-configuration method and network based on that system are provided, wherein, the DPOE system includes an acquisition unit, an analyzing unit and a configuration unit; the service auto-configuration network includes a DPOE system, a back-office management system and an ONU; the service auto-configuration method based on that system includes: the DPOE system acquiring a configuration file from the back-office management system, wherein the configuration file includes configuration information of the ONU and configuration information of an OLT in the DPOE system; the DPOE system analyzing the configuration file and obtaining the configuration information of the ONU and the configuration information of the OLT; configuring the OLT locally and configuring the ONU via a management channel between the OLT and the ONU. Thus the service can be opened without performing further configuration to the OLT individually after the process of the ONU initialization is completed.

11 Claims, 3 Drawing Sheets

(51) Int. Cl.
*H04L 12/24* (2006.01)
*H04L 12/46* (2006.01)
*H04Q 11/00* (2006.01)
*H04L 29/12* (2006.01)

(52) U.S. Cl.
CPC ........ *H04L41/0806* (2013.01); *H04Q 11/0067* (2013.01); *H04L 41/0226* (2013.01); *H04L 61/2015* (2013.01)

(56) References Cited

U.S. PATENT DOCUMENTS

2008/0037563 A1* 2/2008 Bernard ............. H04L 41/0806
370/401
2008/0069564 A1* 3/2008 Bernard ............. H04Q 11/0067
398/72
2011/0131624 A1* 6/2011 Wu ..................... H04L 41/0226
725/111
2014/0023366 A1 1/2014 Zang et al.

FOREIGN PATENT DOCUMENTS

| | | | | |
|---|---|---|---|---|
| CN | 101997725 A | * | 3/2011 | ............. H04L 12/24 |
| CN | 101997725 A | | 3/2011 | |
| WO | 2012/139453 A1 | | 10/2012 | |

OTHER PUBLICATIONS

Canadian Office Action dated May 13, 2015 of Canadian patent Application No. 2,832,394.

* cited by examiner

DPOE SYSTEM AND SERVICE AUTO-CONFIGURATION METHOD AND NETWORK BASED THEREON

TECHNICAL FIELD

The present document relates to the field of communication, and in particular, to a passive optical network (PON), especially to a service auto-configuration method of an Ethernet passive optical network system based on a data over cable service interface system (DOCSIS) back-office management system.

BACKGROUND OF THE RELATED ART

Regarding a PON system based on a DOCSIS back-office management, taking a DPOE (DOCSIS Provisioning Of EPON) network as an example, FIG. 1 is a topological structure diagram of the DPOE network, and that network is composed of a back-office management system including a Trivial File Transfer Protocol (TFTP) server, a DPOE system including equipments of a virtual coaxial cable modem (vCM), an optical line terminal (OLT) and other equipments, a DPOE optical network unit (ONU) and a customer premise equipment (CPE) terminal connected on the ONU. The process of the ONU initiating a registration simulates an initialization process of the coaxial cable modem, which is initiated by the vCM, and it acquires a configuration file from the TFTP server, and then the DPOE system configures to send configuration information of the acquired configuration file to the ONU through a management channel.

As shown in FIG. 2, a data configuration process of an ONU at present is mainly achieved through the following process:

S201: the ONU is powered up and starts an initialization process;

S202: the ONU and the DPOE system complete the initialization process of a PON layer;

S203: the DPOE system performs an authentication on the ONU, and completes a registration after the authorization is passed;

S204~S205: the vCM in the DPOE system initiates an initialization process specified according to a DOCSIS 3.0 specification, sends a TFTP request to the back-office management system, and downloads the configuration file from the TFTP server of the back-office management system;

S206~S207: after relevant processing, then the configuration file is configured on the related ONU through the corresponding configuration management channel, wherein the configuration file includes service attributes and parameters which are provided by the operator to users connected to the ONU;

S208: after the data configuration is completed for the ONU, the ONU notifies the DPOE system, and the whole registration process of the ONU ends.

However, after completing the configuration of the ONU, in order to make the service on the ONU operate normally, it will need to perform the corresponding configuration on the OLT. Generally speaking, the configuration on the OLT needs to be performed by hand individually, or performed through a command line, or performed through a simple network management protocol (SNMP) interface between an Element Management System (EMS) and the OLT.

Opening services corresponding to enterprise users generally needs a large number of configurations to the OLT of the DPOE system in order to open the services, so it needs to configure the relevant parameters of the OLT at the same time for the ONU opening these services.

For example, in general, regarding the normal opening of Ethernet Virtual Private LAN (EVP-LAN) services, the relevant configurations of the Virtual Local Area Network (VLAN) need to be performed at the OLT and the ONU, showing as follows.

The configurations required to be performed at the ONU are:

1, the VLAN identifier of the specific service operated on an UNI port on the ONU; and 2, a Logical Link Identifier (LLID)/Generic Encapsulation Method (GEM) port identifier (PORT ID) corresponding to the relevant service of the UNI port on the ONU.

The configurations on the OLT of the DPOE system are:

1, the LLID/GEM PORT ID used on the OLT (PON line card) of the DPOE system which is associated with the specific service operated on the UNI port;

2, the VLAN used on the OLT PON line card of the DPOE system which is used for the specific service operated on the port UNI of the ONU;

3, the VLAN used to identified the specific service operated on the UNI port of the ONU which is configured on an OLT service processing board of the DPOE system;

4, a Multi-Protocol Label Switching (MPLS) entity on the OLT service processing board of the DPOE system, which is associated with the specific service operated on the ONU UNI port;

5, an MPLS pseudo line identifier on the OLT of the DPOE system, which is associated with the specific service operated on the ONU UNI port;

6, the OLT of the DPOE system initiating an MPLS protocol;

7, the VLAN identifier of a corresponding uplink port on the OLT of the DPOE system, which corresponds to the specific service operated on the UNI port on the ONU.

Therefore, in order to operate the service, the corresponding numerous configurations which are required to be performed on the OLT of the DPOE system are relative complex, and this way of configuring the ONU and the OLT respectively has low configuration efficiency. Especially, the configuration efficiency of the whole system is affected even more when more complex configurations need to be performed on the OLT correspondingly for the key service operation on the ONU.

CONTENT OF THE INVENTION

The technical problem required to be solved by the present document is to provide a DOCSIS Provisioning Of EPON (DPOE) system and a service auto-configuration method and network based on that system, to make the service be opened without performing further configuration to the OLT individually after the process of the ONU initialization is completed, so as to improve the configuration efficiency of the whole system.

In order to solve the above-mentioned technical problem, the present document provides a service auto-configuration method of an DOCSIS Provisioning Of EPON (DPOE) system, and the method comprises:

the DPOE system acquiring a configuration file from a back-office management system, wherein the configuration file comprises configuration information of an optical network unit (ONU) and configuration information of an optical line terminal (OLT) in the DPOE system;

the DPOE system analyzing the acquired configuration file, and obtaining the configuration information of the ONU and the configuration information of the OLT; and the DPOE system configuring the OLT locally and configuring the ONU via a management channel between the OLT and the ONU.

Preferably, the configuration information of the OLT is configuration information related to services opened by the ONU.

Preferably, the services opened by the ONU comprise one or more of Ethernet based line (E-LINE) services, Ethernet based tree (E-TREE) services and Ethernet based LAN (E-LAN) services; and the configuration information of the OLT comprises one or more of a virtual local area network (VLAN), a user port and a user media access control (MAC) address of the OLT related to the services opened by the ONU.

Preferably, when analyzing the acquired configuration file, the DPOE system further converts the configuration information of the ONU into a message format which can be identified by the ONU, and converts the configuration information of the OLT into a message format which can be identified by the OLT.

Preferably, the method is performed in an process of ONU initialization.

In addition, in order to solve the above-mentioned technical problem, the present document further provides an Ethernet passive optical network based on a DOCSIS Provisioning Of EPON (DPOE) system, and the system comprises an acquisition unit, an analyzing unit and a configuration unit; wherein, the acquisition unit is configured to acquire a configuration file from a back-office management system, wherein the configuration file comprises configuration information of an optical network unit (ONU) and configuration information of an optical line terminal (OLT) in the DPOE system;

the analyzing unit is configured to analyze the acquired configuration file and obtain the configuration information of the ONU and the configuration information of the OLT; and the configuration unit is configured to configure the OLT locally and configure the ONU via a management channel between the OLT and the ONU.

Preferably, the analyzing unit is further configured to, when analyzing the acquired configuration file, convert the configuration information of the ONU into a message format which can be identified by the ONU and convert the configuration information of the OLT into a message format which can be identified by the OLT.

In addition, in order to solve the above-mentioned technical problem, the present document further provides a service auto-configuration network of a DOCSIS Provisioning Of EPON (DPOE) system, and the network comprises a DPOE system, a back-office management system and an optical network unit (ONU); wherein, the DPOE system adopts the above-mentioned DPOE system; and the back-office management system is configured to: save the configuration file, and download the configuration file to the DPOE system, wherein the configuration file comprises the configuration information of the ONU and the configuration information of the OLT in the DPOE system.

Preferably, the back-office management system comprises a trivial file transfer protocol (TFTP) server configured to: receive a TFTP request initiated by the DPOE system, respond to that TFTP request, and download the configuration file to the DPOE system.

Preferably, the configuration information of the OLT is configuration information related to services opened by the ONU.

Preferably, the services opened by the ONU comprise one or more of Ethernet based line (E-LINE) services, Ethernet based tree (E-TREE) services and Ethernet based LAN (E-LAN) services; and the configuration information of the OLT comprises one or more of a virtual local area network (VLAN), a user port and a user media access control (MAC) address of the OLT related to the services opened by the ONU.

The DPOE system and the service auto-configuration method and network based on that system provided by the embodiments of the present document complete the automatic configuration of the OLT and the ONU at the same time through a configuration file including the configuration information of the ONU and the configuration information of the OLT in the DPOE system; after the process of the ONU initialization is completed, the service can be opened without performing further configuration to the OLT individually. Especially, when more complex configurations are needed to be performed on the OLT correspondingly for the key service operation on the ONU, it can improve the configuration efficiency of the whole system very well.

PREFERRED EMBODIMENTS OF THE PRESENT INVENTION

In order to make the objective, the technical scheme and the advantage of the present document more clear and understandable, embodiments of the present document are described in detail in combination with accompanying drawings hereinafter. It should be illustrated that, in the case of not conflicting, the embodiments in the present application and features in these embodiments can be combined with each other at random.

Figure 1:
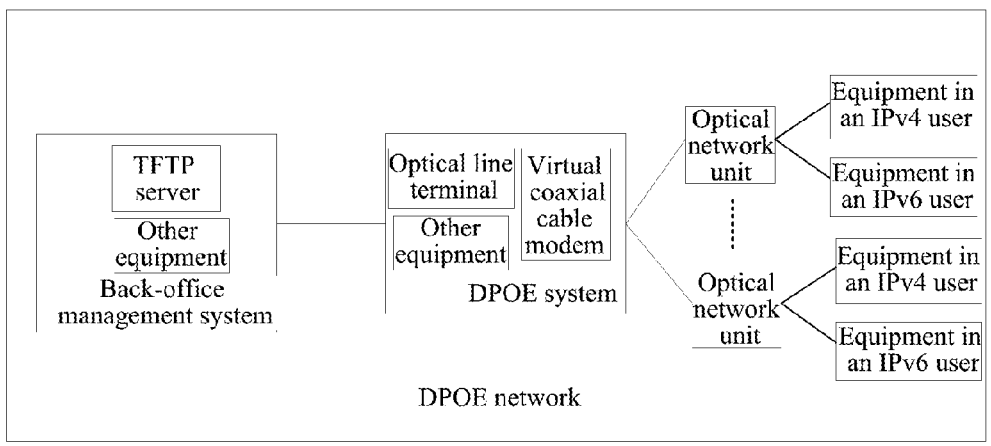
FIG. 1 is a topology structure diagram of a DPOE network.
Figure 2:
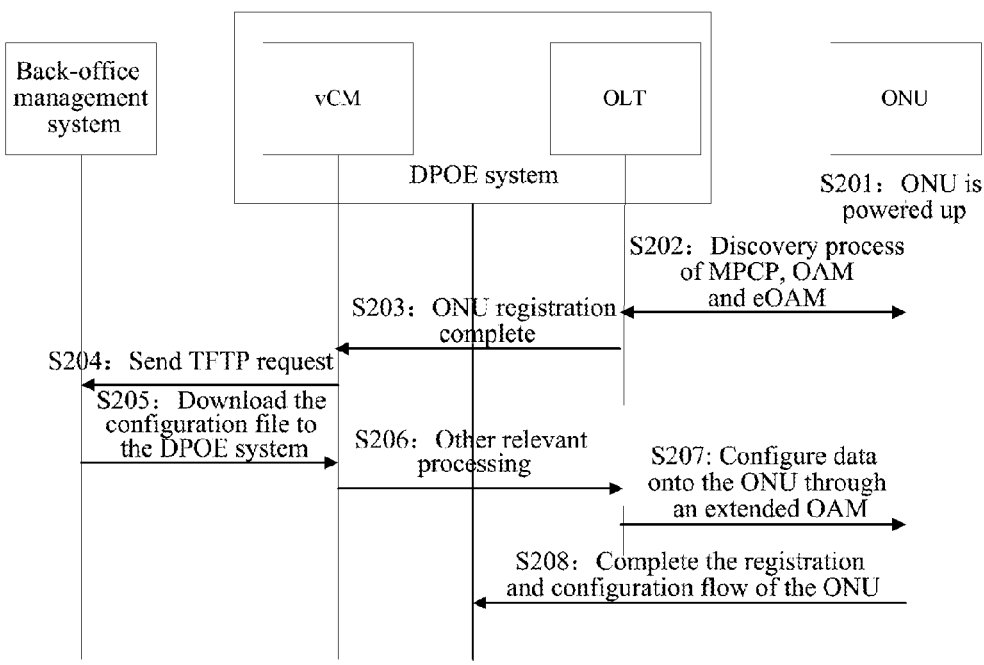
FIG. 2 is a flow chart of a conventional ONU data configuration.
Figure 3:
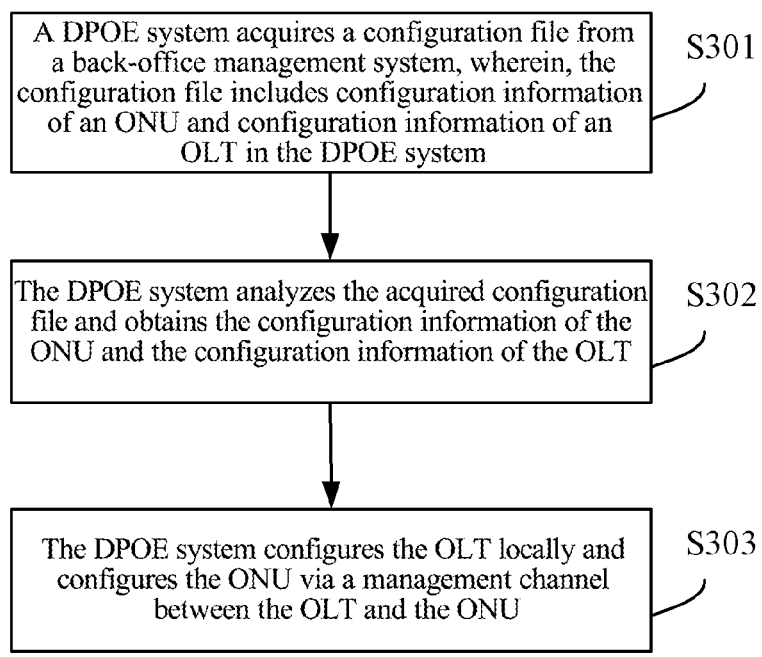
FIG. 3 is a flow chart of a service auto-configuration method of a DPOE system according to an embodiment of the present document.

As shown in FIG. 3, an embodiment of the present invention document provides a service auto-configuration method of a DPOE system, including the following steps.

S301, the DPOE system acquires a configuration file from a back-office management system, wherein the configuration file includes configuration information of an optical network unit (ONU) and configuration information of an optical line terminal (OLT) in the DPOE system.

In the process of ONU initialization, a virtual coaxial cable modem (vCM) in the DPOE system initiates a TFTP request to the back-office management system, and the DPOE system acquires the configuration file from that back-office management system, wherein the configuration file includes the added configuration information about the OLT of the DPOE system and the configuration information of the OLT is the configuration information related to services opened by the ONU, in this way, the configuration file acquired by the DPOE system includes the configuration information for configuring the ONU and the OLT.

S302, the DPOE system analyzes the acquired configuration file and obtains the configuration information of the ONU and the configuration information of the OLT.

When analyzing the acquired configuration file, the DPOE system further converts the configuration information of the ONU into a message format which can be identified by the ONU, and converts the configuration information of the OLT into a message format which can be identified by the OLT.

S303: the DPOE system configures the OLT locally and configures the ONU via a management channel between the OLT and the ONU.

After acquiring the configuration file, the DPOE system analyzes the configuration file and distinguishes the configuration information for configuring the ONU and the OLT, configures the OLT locally, transfers the information for configuring the ONU through the management channel between the DPOE system and the ONU, and configures the relevant parameters of the ONU. The management channel can include an OMCI channel of a GPON or an extended OAM of an EPON system.

Opening services corresponding to the enterprise users, the opened services generally include, but not limited to, Ethernet based line (E-LINE) services, Ethernet based tree (E-TREE) services and Ethernet based LAN (E-LAN) services. A lot of configurations to the OLT of the DPOE system is needed during completing the opening of the services, so at the same time the ONU opening these services needs to be configured with the relevant parameters of the OLT, such as, the information of a VLAN, a user port and a user media access control (MAC) address, etc.

Correspondingly, an embodiment of the present invention further provides a DPOE system, including an acquisition unit, an analyzing unit and a configuration unit; wherein, the acquisition unit is used to acquire a configuration file from a back-office management system, wherein the configuration file includes configuration information of an optical network unit (ONU) and configuration information of an optical line terminal (OLT) in the DPOE system;

the analyzing unit is used to analyze the acquired configuration file and obtain the configuration information of the ONU and the configuration information of the OLT;

when analyzing the acquired configuration file, the analyzing unit further converts the configuration information of the ONU into a message format which can be identified by the ONU, and converts the configuration information of the OLT into a message format which can be identified by the OLT;

the configuration unit is used to configure the OLT locally and configure the ONU via a management channel between the OLT and the ONU.

In an application example, the vCM of the DPOE system can realize the corresponding functions of the above-mentioned acquisition unit, the analyzing unit and the configuration unit.

When implementing specifically, the vCM can be a single function entity and also can be integrated on the OLT to be a part of the OLT.

Correspondingly, an embodiment of the present invention further provides a service auto-configuration network of a DPOE system, including a DPOE system, a back-office management system and an optical network unit (ONU); wherein, the DPOE system can adopt the above-provided DPOE system; and the back-office management system is used to save the configuration file and download the configuration file to the DPOE system, wherein the configuration file includes the configuration information of the ONU and the configuration information of the OLT in the DPOE system.

The back-office management system includes a TFTP server, wherein, the TFTP server is used to receive a TFTP request initiated by the DPOE system and respond to that TFTP request, and download the configuration file into the DPOE system.

Wherein, the configuration information of the OLT is the configuration information related to services opened by the ONU.

The services opened by the ONU include one or more of the E-LINE services, the E-TREE services and the E-LAN services; and the configuration information of the OLT includes one or more of a VLAN, a user port and a MAC address of the OLT related to the services opened by the ONU.

Figure 4:
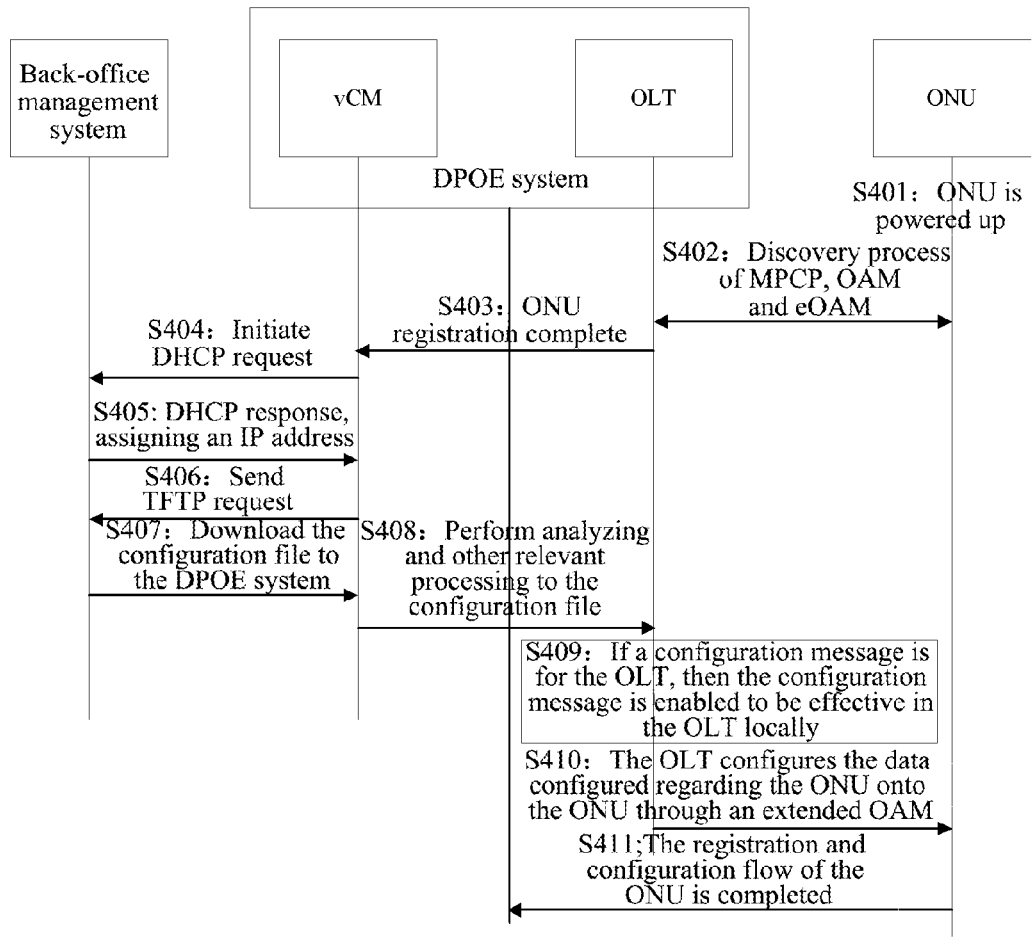
FIG. 4 is a flow chart of auto-configuration of an OLT and an ONU according to an embodiment of the present document.

In an application example, as shown in FIG. 4, in the process of the ONU powering up and registering, the process of configuration to the ONU and the OLT of the DPOE system is completed at the same time, which includes the following steps.

S401: the ONU is powered up, and the initialization process is started;

S402: the ONU and the DPOE system complete the initialization process of a PON layer;

S403: the DPOE system performs authentication on the ONU, and the authentication is passed;

S404: the vCM initiates a Dynamic Host Configuration Protocol (DHCP) request to a DHCP server of the back-office management system;

S405: the DHCP server of the back-office management system responds to the DHCP request, and assigns an IP address for the vCM;

S406: the vCM initiates a TFTP request to a TFTP server of the back-office management system, to request to acquire the configuration data file of the ONU corresponding to that vCM;

S407: the TFTP server of the back-office management system responds to the TFTP request initiated by the vCM, and downloads the configuration file of the ONU corresponding to that vCM into the DPOE system;

S408: the above-mentioned configuration file is analyzed and processed, wherein, regarding auto-operation of the EVP-LAN service, the configuration file includes a TLV required to be configured for the OLT of the DPOE system, for example: adding on the OLT the VLAN which is identified as V2 for a service V1 operated on a port UNI1 on the ONU; that TLV is a TLV which is newly added in the existing DOCSIS3.0 standard, and the format of that TLV is shown in Table 1 as follows.

TABLE 1

Format of the newly added TLV in the DOCSIS3.0 standard

| Length (octets) | Field (name) | Value (hex) | Notes |
| --- | --- | --- | --- |
| 1 | Type | 0x02 | Corresponding VLAN identifier for identifying a certain service on the OLT of the DPOE system |
| 1 | Length | varies | 11 + N |
| 6 | Value ONU identifier | varies | MAC address identifier of the ONU |
| 1 | ONU port number | varies | |
| 2 | VLAN identifier corresponding to the service operated on the ONU | varies | |

TABLE 1-continued

Format of the newly added TLV in the DOCSIS3.0 standard

| Length (octets) | Field (name) | Value (hex) | Notes |
|---|---|---|---|
| 2 | VLAN identifier of a certain service operated on a certain UNI port of the ONU on the OLT | varies | |
| N | Vendor-specific field | varies | |

Another example, an MPLS pseudo line identifier PW1, which is associated to the service V1 operated on the port UNI1 of the ONU, on the OLT is configured, and the TLV can be shown in Table 2 as follows.

TABLE 2

Format of the newly added TLV in the DOCSIS3.0 standard

| Length (octets) | Field (name) | Value (hex) | Notes |
|---|---|---|---|
| 1 | Type | 0x05 | Corresponding identifier of PW of MPLS for identifying a certain service on the OLT |
| 1 | Length | varies | 13 + N |
| 6 | Value ONU identifier | varies | MAC address identifier of the ONU |
| 1 | ONU port number | varies | |
| 2 | VLAN identifier corresponding to the service operated on the ONU | varies | |
| 4 | PW identifier of a certain service operated on a certain UNI port of the ONU on the OLT | varies | |
| N | Vendor-specific field | varies | |

S409: through the analyzing and processing at step S408, the TLV based on the DOCSIS in the configuration file is converted into the message format which can be identified by the ONU and the OLT respectively. The DPOE system will identify which configuration message is for the OLT and which configuration message is for the ONU. For example, the DPOE system can identify the configuration data of the OLT and the configuration data of the ONU automatically according to the content of the type field; if it is configured for the OLT, then the configuration message is enabled to be effective in the OLT locally; if the data is configured for the ONU, then step S410 is executed.

S410: the OLT configures the data configured for the ONU onto the ONU via the management channel between the OLT and the ONU, such as the extended OAM or the OMCI.

S411: after completing the data configuration to the ONU, the ONU notifies the DPOE system, and the whole registration process of the ONU ends.

At this moment, the EVP-LAN service of the user connected to the UNI1 on the ONU can be opened, and other extra configurations are no longer needed.

It can be seen from the above-mentioned embodiments that, compared with the related art, the present document adds the configuration information about the OLT of the DPOE system in the configuration file, and completes the automatic configuration on the OLT and the ONU at the same time; after the process of the ONU initialization is completed, the service can be opened without performing further configuration to the OLT individually. Especially, when more complex configurations are needed to be performed on the OLT correspondingly for the key service operation on the ONU, it can improve the configuration efficiency of the whole system very well.

The above description is only the preferable embodiments of the present document and is not intended to limit the protection scope of the present document. All of modifications without departing from the spirit and essence of the present document should be embodied in the protection scope of the present document.

INDUSTRIAL APPLICABILITY

The DPOE system and the service auto-configuration method and network based on that system provided by the embodiments of the present document complete the automatic configuration of the OLT and the ONU at the same time through a configuration file including the configuration information of the ONU and the configuration information of the OLT in the DPOE system; after the process of the ONU initialization is completed, the service can be opened without performing further configuration to the OLT individually. Especially, when more complex configurations are needed to be performed on the OLT correspondingly for the key service operation on the ONU, it can improve the configuration efficiency of the whole system very well.

What we claim is:

1. A service auto-configuration method of a DOCSIS Provisioning Of EPON (DPOE) system, comprising:
   the DPOE system acquiring a configuration file from a back-office management system, wherein the configuration file comprises both configuration information of an optical network unit (ONU) and configuration information of an optical line terminal (OLT) in the DPOE system;
   the DPOE system analyzing the acquired configuration file, and obtaining both the configuration information of the ONU and the configuration information of the OLT; and
   the DPOE system configuring the OLT locally according to the configuration information of the OLT and meanwhile configuring the ONU according to the configuration information of the ONU via a management channel between the OLT and the ONU;
   wherein, the method is performed in a process of ONU initialization; and
   wherein, when analyzing the acquired configuration file, the DPOE system further converts the configuration information of the ONU into a message format which can be identified by the ONU, and converts the configuration information of the OLT into a message format which can be identified by the OLT.

2. The method according to claim 1, wherein, the configuration information of the OLT is configuration information related to services opened by the ONU.

3. The method according to claim 2, wherein,
   the services opened by the ONU comprise one or more of Ethernet based line (E-LINE) services, Ethernet based tree (E-TREE) services and Ethernet based LAN (E-LAN) services; and
   the configuration information of the OLT comprises one or more of a virtual local area network (VLAN), a user port and a user media access control (MAC) address of the OLT related to the services opened by the ONU.

4. A data over cable service interface system (DOCSIS) Provisioning Of EPON (DPOE) system, comprising an acquisition unit, an analyzing unit and a configuration unit; wherein, during an process of an optical network unit (ONU) initialization, the acquisition unit is configured to acquire a configuration file from a back-office management system, wherein the configuration file comprises configuration both information of the ONU and configuration information of an optical line terminal (OLT) in the DPOE system;

the analyzing unit is configured to analyze the acquired configuration file and obtain both the configuration information of the ONU and the configuration information of the OLT; and the configuration unit is configured to configure the OLT locally according to the configuration information of the OLT and meanwhile configure the ONU according to the configuration information of the ONU via a management channel between the OLT and the ONU.

5. The system according to claim 4, wherein,
the analyzing unit is further configured to, when analyzing the acquired configuration file, convert the configuration information of the ONU into a message format which can be identified by the ONU and convert the configuration information of the OLT into a message format which can be identified by the OLT.

6. A service auto-configuration network of a DOCSIS Provisioning Of EPON (DPOE) system, comprising a DPOE system, a back-office management system and a plurality of optical network units (ONUs); wherein, the DPOE system comprises an acquisition unit, an analyzing unit and a configuration unit; wherein, during an process of an optical network unit (ONU) initialization, the acquisition unit is configured to acquire a configuration file from a back-office management system, wherein the configuration file comprises configuration both information of the ONU and configuration information of an optical line terminal (OLT) in the DPOE system;

the analyzing unit is configured to analyze the acquired configuration file and obtain both the configuration information of the ONU and the configuration information of the OLT; and the configuration unit is configured to configure the OLT locally according to the configuration information of the OLT and meanwhile configure the ONU according to the configuration information of the ONU via a management channel between the OLT and the ONU; and the back-office management system is configured to: save the configuration file, and download the configuration file to the DPOE system, wherein the configuration file comprises the configuration information of the ONU and the configuration information of the OLT in the DPOE system.

7. The network according to claim 6, wherein,
the back-office management system comprises a trivial file transfer protocol (TFTP) server configured to: receive a TFTP request initiated by the DPOE system, respond to that TFTP request, and download the configuration file to the DPOE system.

8. The network according to claim 7, wherein, the configuration information of the OLT is configuration information related to services opened by the ONU.

9. The network according to claim 6, wherein, the configuration information of the OLT is configuration information related to services opened by the ONU.

10. The network according to claim 9, wherein, the services opened by the ONU comprise one or more of Ethernet based line (E-LINE) services, Ethernet based tree (E-TREE) services and Ethernet based LAN (E-LAN) services; and the configuration information of the OLT comprises one or more of a virtual local area network (VLAN), a user port and a user media access control (MAC) address of the OLT related to the services opened by the ONU.

11. The network according to claim 6, wherein, the analyzing unit is further configured to, when analyzing the acquired configuration file, convert the configuration information of the ONU into a message format which can be identified by the ONU and convert the configuration information of the OLT into a message format which can be identified by the OLT.

* * * * *